(12) United States Patent
Sezginer et al.

(10) Patent No.: US 8,767,886 B2
(45) Date of Patent: Jul. 1, 2014

(54) ITERATIVE CHANNEL ESTIMATION METHOD WITH COMPENSATED MMSE

(75) Inventors: Serdar Sezginer, Saint Cloud (FR); Yang Liu, Paris (FR)

(73) Assignee: Sequans Communications, Puteaux (FR)

(*) Notice: Subject to any disclaimer, the term of this patent is extended or adjusted under 35 U.S.C. 154(b) by 120 days.

(21) Appl. No.: 13/524,775

(22) Filed: Jun. 15, 2012

(65) Prior Publication Data

US 2012/0321025 A1    Dec. 20, 2012

(30) Foreign Application Priority Data

Jun. 16, 2011    (EP) .................................. 11170157

(51) Int. Cl.
    *H03D 1/00*    (2006.01)
(52) U.S. Cl.
    USPC ........... 375/340; 375/308; 375/146; 375/267; 370/203; 370/350
(58) Field of Classification Search
    USPC .................................. 375/267, 346, 146, 308
    See application file for complete search history.

(56) References Cited

U.S. PATENT DOCUMENTS

| 2005/0207334 A1* | 9/2005 | Hadad | 370/203 |
| 2007/0041464 A1* | 2/2007 | Kim et al. | 375/267 |
| 2009/0304104 A1* | 12/2009 | Le Saux et al. | 375/267 |
| 2010/0246641 A1* | 9/2010 | Li | 375/146 |
| 2013/0136208 A1* | 5/2013 | Murakami et al. | 375/308 |

FOREIGN PATENT DOCUMENTS

EP    1748610 A1    1/2007

OTHER PUBLICATIONS

Sanzi et al., "A Comparative Study of Interative Channel Estimators for Mobile OFDM Systems" IEEE Transactions on Wireless Communications, IEEE Service Enter, Piscataway, Sep. 1, 2003.

C. Berrou et al., "Near Shannon Limit Error Correcting Coding and Decoding: Turbo-Codes" IEEE International Conference, May 2, 1993.

L. Boher et al., "Performance Analysis of Interative Receiver in 3GPP/LTE DL MIMO OFDM System" IEEE 19th International Symposium on Spread Spectrum Techniques and Applications, Aug. 2008.

3GPP "Evolved Universal Terrestrial Radio Access (E-UTRA); Physical Channels and Modulation" Mar. 2008.

J.J. Van De Beek et al., "On Channel Estimation in OFDM Systems," in Proc. 45th IEEE Vehicular Technology Conference, Sep. 1995.

European Search Report and Written Opinion dated Dec. 19, 2011 for corresponding European Application No. 11170157.9, filed Jun. 16, 2011.

* cited by examiner

*Primary Examiner* — Eva Puente
(74) *Attorney, Agent, or Firm* — David D. Brush; Westman, Champlin & Koehler, P.A.

(57) ABSTRACT

A channel estimation treatment method and device for obtaining binary data conveyed in a signal. The method includes: obtaining a current vector of channel estimates, each element of the current vector corresponding to an estimate of a subchannel; detecting, inside the current vector, at least one pilot symbol; splitting the current vector in at least two subvectors, at least one first subvector including channel estimates related to data symbols and/or pilots symbols and at least one second subvector including channel estimates related to null symbols; decoding the at least one first subvector, delivering at least one first treated subvector; modifying the at least one second subvector by assuming presence of pilot symbols in the at least one second subvector, delivering at least one second treated subvector; and calculating a new vector of channel estimates with the at least one first treated subvector and the at least one second treated subvector.

8 Claims, 3 Drawing Sheets

ITERATIVE CHANNEL ESTIMATION METHOD WITH COMPENSATED MMSE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to data reception techniques and transmission techniques.

More particularly, the disclosure relates to channel estimation techniques in OFDM transmission systems. Such systems comprise some base station and some mobile station. More particularly, the disclosure relates to a method and to a device for estimating a received signal in a wireless receiver.

BACKGROUND OF THE DISCLOSURE

In recent years, with the appearance of "turbo principle" ("Near shannon limit error-correcting coding and decoding: Turbo-codes", C. BEROU), iterative receivers are popular and capable because of their excellent performances.

Different mechanisms have been proposed and studied, for example, iterative detection, iterative multi-input multi-output (MIMO) equalization, etc. However, these iterative mechanisms are seriously affected by channel estimator.

For example, in "Performance Analysis of Iterative Receiver in 3GPP/LTE DL MIMO OFDMA System" (L. BOHER et Al.), it has been shown that an iterative MIMO equalizer is more sensitive to channel estimation, and that the traditional non-iterative channel estimators cannot provide sufficiently accurate channel estimates. This necessitates more accurate channel estimates in order to improve system performances.

Recently, iterative channel estimation is being considered to improve the accuracy of channel estimation, which uses the "soft" information of data to improve channel estimation performance (soft information stands for information which is calculated along the iterative process, and which is used for the following iteration). This type of channel estimation algorithms is particularly helpful for systems which have fewer and/or lower powered pilot symbols. For example, in Long Term Evolution (LTE) systems, at most 2 orthogonal frequency-division multiplexing (OFDM) symbols carry pilots in a given resource block (RB=minimum allocation unit over 7 OFDM symbols with normal cyclic prefix and 12 subcarriers) and this can decrease to 1 OFDM symbols for MIMO transmission (3GPP, "Evolved universal terrestrial radio access (E-UTRA); physical channels and modulation", available at http://www.3gpp.org/ftp/Specs/html-info/36211.htm), thus defining a so called "sparse pilot arrangement".

With this sparse pilot arrangement, the iterative channel estimation can be a good candidate to improve channel estimation. Moreover, for future standards, one of the key features will be power efficiency and, in this manner, decreasing the power of pilots is one of the possible ways to improve the power consumption efficiency. In such systems, the channel estimation algorithms used in nowadays systems will have less accuracy and more robust algorithms are needed.

Some iterative channel estimators have already been proposed for OFDM systems by using the extrinsic information from decoder. Among these iterative algorithms, the iterative minimum mean square error (MMSE) channel estimator provides excellent performances which approach the performance with perfect channel state information (CSI).

The iterative MMSE is based on the traditional MMSE channel estimator defined in "On channel estimation in OFDM systems" (J.-J. van de Beek et Al.) and improves the accuracy of channel estimation by using the soft information obtained from channel decoder. In the frequency domain, the traditional iterative MMSE channel estimation at the i+1$^{th}$ iteration $\hat{h}_{MMSE}^{(i+1)}$ can be MMSE formulized as:

$$\hat{h}_{MMSE}^{(i+1)} = \Omega_L(\Omega_L^H \tilde{R}_{N\times N}^{(i)} \Omega_L + \sigma^2 C_{gg}^{-1})^{-1} \Omega_L^H \tilde{X}^{(i)*} y, \quad (1)$$

where $(\bullet)^H$ stands for transpose-conjugate and $(\bullet)^*$ stands for complex conjugate.

Here, y stands for the received signal vector, $\Omega_L$ is a matrix consisting of the first L (L representing the delay spread of channel) columns of the FFT matrix, $\tilde{X}^{(i)}$ represents a diagonal matrix which has soft symbols $\tilde{X}_{kk}^{(i)}$ as diagonal entries, which contain the a posteriori probabilities (APPs) of the data $X_{kk}$ at the i$^{th}$ iteration, $\hat{h}_{MMSE}^{(i+1)}$ is the estimated channel vector at the (i+1)$^{th}$ iteration, the matrix $\tilde{R}_{N\times N}^{(i)}$ is defined as:

$$\tilde{R}_{N\times N}^{(i)} = \sum_X APP_i(X) \tilde{X}^{(i)*} \tilde{X}^{(i)}; \quad (2)$$

$C_{gg}$ is the auto-covariance matrix of impulse response g and $\sigma^2$ denotes the noise variance. In equation (1), the complexity of the iterative MMSE channel estimator is high due to the matrix inversion of size L×L which has to be performed at each iteration of the estimation process.

Furthermore, in LTE systems, the distributed resource allocation is used to vary resources blocks (RB) positions in different OFDM symbols. With the iterative MMSE algorithm, the allocated RB positions have to be pinpointed and the matrix to be inverted is different from one OFDM symbol to another one.

This process adds more complexities to the iterative MMSE algorithm. Therefore, an iterative MMSE algorithm which is not sensitive to RB positions is more desirable because of its reduced complexity.

Thus, it is important to propose a channel estimation algorithm in which the complexity of the calculation is reduced in order to shorten latency time.

For clarity purposes, it is further noted that, in the present description, a capital letter (like H, R, X) represents a matrix whereas a lower case letter (like h, y, . . . ) represents a vector (i.e. a matrix with a single row). For example, h represents channel estimates in Frequency Domain and it is a vector. It is also specified that the expression "a channel estimate" is a value which is the result of "a channel estimation". (the noun "estimate" means a estimated value and the noun "estimation" means the action for obtaining an estimate).

SUMMARY

An embodiment of the present invention discloses an optimized MMSE channel estimation method which does not have the drawbacks of the classical MMSE channel estimation method. The drawbacks of the prior art method are eliminated by the implementation of an embodiment of the method as claimed in claim 1.

More specifically, an embodiment of the invention relates to a channel estimation treatment method, said channel estimation being used for obtaining binary data conveyed in a signal. The method comprises the following processing steps:
- obtaining a vector of channel estimates, called a current vector, each element of the current vector corresponding to an estimate of a subchannel;
- detecting, inside said current vector, at least one pilot symbol;
- splitting said current vector in at least two distinct subvector, at least one first subvector comprising channel estimates related to data symbols and/or pilots symbols and at least one second subvector comprising channel estimates related to null symbols;
- decoding of said at least one subvector, delivering at least one first treated subvector;
- modifying said at least one second subvector by assuming a presence of pilot symbols in said at least one second subvector, delivering at least one second treated subvector;
- calculating a new vector of channel estimates with said at least one first treated subvector and said at least one second treated subvector.

Thus, by assuming a presence of pilot symbols in said at least one second subvector, the implementation of the calculation of the new vector of channel estimates is facilitated.

In the following description, the traditional MMSE channel estimation method is considered and in particular, a so-called iterative compensated MMSE (IC-MMSE) channel estimation method is proposed for overcoming the drawbacks of the traditional MMSE channel estimation method.

This iterative compensated MMSE estimation method takes advantage of the "null" subcarriers for reducing the complexity and improving the accuracy of the traditional MMSE channel estimation method.

According to an embodiment of the invention, said step of calculating a new vector of channel estimates ($\hat{h}_{IC\text{-}MMSE}^{(i+1)}$) with said at least one first treated subvector ($\hat{h}_N^{(i)}$) and said at least one second treated subvector ($\hat{h}_{DP}^{(i)}$) implements the following function:

$$\hat{h}_{IC\text{-}MMSE}^{(i+1)} = \Omega_L(\Omega_L^H \Omega_L + \sigma^2 C_{gg}^{-1})^{-1} \Omega_L^H (\hat{h}_N^{(i)}, \tilde{R}_{N_{DP} \times N_{DP}}^{(i)-1} \tilde{x}_{DP}^{(i)*} y)$$

where:
- $\Omega_L$ is a matrix consisting of the first L columns of a predefined FFT matrix, said FFT matrix being as a N×N matrix and only related to the number of sub-carriers;
- L represents the delay spread of channel;
- $\hat{h}_N^{(i)}$ denotes the first treated subvector;
- $\tilde{R}_{N_{DP} \times N_{DP}}^{(i)-1}$ contains the soft powers of transmitted symbols. It can be obtained by equation (2), but without null sub-carriers;
- $\tilde{x}_{DP}^{(i)}$ is a diagonal matrix comprising soft information;
- y represents the received signals.

The FFT matrix is a constant one, which is defined as a N×N matrix and only related to the number of sub-carriers. Therefore, for a designed OFDM system, the FFT matrix is constant. For a certain channel model, the value of L is determined. If we take the first L columns from the FFT matrix, which is predefined, the matrix $\Omega_L$ is constant, too. $\Omega_L$ is not diagonal.

In another aspect, an embodiment of the invention also relates to a device for implementing the proposed method. This device can be embedded in a receiver of a mobile device.

In another aspect, an embodiment of the invention also relates to a computer program product downloadable from a communications network and/or stored on a computer readable medium and/or executed by a microprocessor, characterized in that it includes instructions of program code for implementing the method as previously described, when run on a computer.

BRIEF DESCRIPTION OF THE DRAWINGS

In the following, embodiments of the invention are described in greater detail by making reference to the drawings in which.

DETAILED DESCRIPTION OF ILLUSTRATIVE EMBODIMENTS

1. Main Features of an Embodiment of the Invention

The idea which forms the base of an embodiment of the invention is to modify the iterative MMSE channel estimation algorithm for reducing complexity of the calculations. Although many other methods have been proposed, it has never been proposed, in the knowledge of the inventors, a method which bases itself on an assumption on the null subcarriers of the signal. More particularly, the specificity of the method of an embodiment of the invention is to suppose that some "virtual" pilot symbols are assumed to exist on the null subcarriers.

The consequences of such an assumption are the following:
- the method is independent of the positions of allocated resources blocks (RB);
- the method always uses the same matrix inverse for the different OFDM symbols;
- the method always uses the same matrix inverse for all the iterations.

In other words, in order to solve the problems in the traditional iterative MMSE channel estimation algorithm, it is proposed an iterative compensated MMSE, namely IC-MMSE, which is independent to the positions of allocated RB and always uses the same matrix inverse for different OFDM symbols and iterations.

Figure 1:
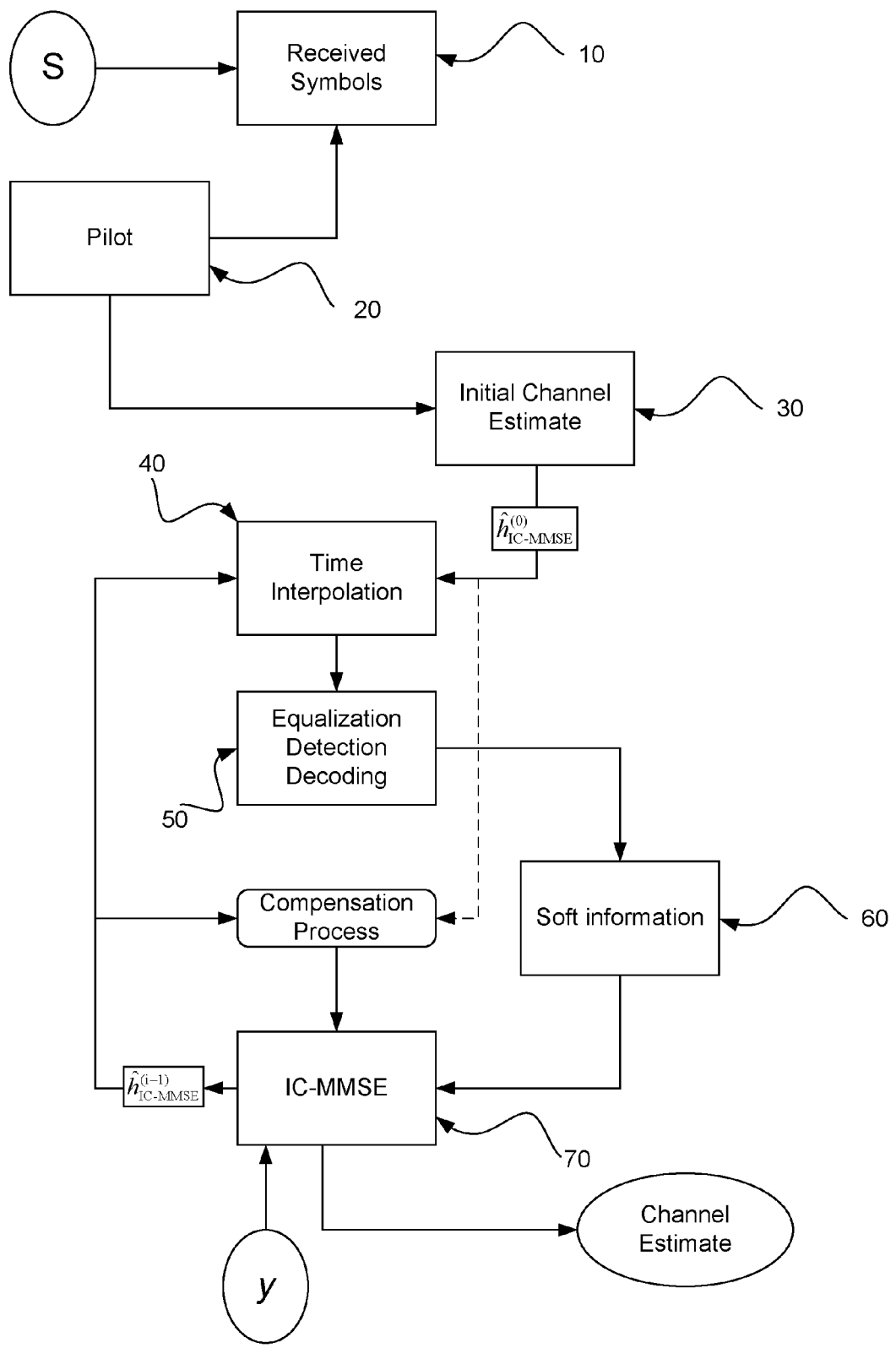
FIG. 1: illustrates a flow chart of the iterative method of an embodiment of the invention.

In a general implementation, described in relation with FIG. 1, the teachings of the current disclosure can be included in a global channel estimation method which comprises the following steps:
a. Receiving the multicarrier signal (10).
b. Extracting the information (20) from the reference symbols (pilots).
c. Generating an initial estimate (30) based on these reference symbols over the OFDM symbols which have pilots.
d. Implement time domain interpolation (40) to obtain all channel estimates over all OFDM symbols.
e. With initial channel estimates, implement equalization, detection and decoding (50).

f. Obtain soft information (60) from decoder and perform IC-MMSE (70) over the OFDM symbols which have pilots to improve the performance of channel estimation.

g. Perform the whole iterations (from 40 to 70) to further improve the performance of channel estimation until the results converge.

Steps a) to c) leads to the initial estimate ($\hat{h}^{(0)}$) which is then used in conjunction with the received signal in the iterative process (steps d) to f)) for obtaining the successive channel estimates according to an embodiment of the invention ($\hat{h}_{IC-MMSE}^{(1)}, \ldots, \hat{h}_{IC-MMSE}^{(i)}, \hat{h}_{IC-MMSE}^{(i+1)}, \ldots, \hat{h}_{IC-MMSE}^{(K)}$). According to a specific embodiment, a maximum number of iteration to process can be specified. This maximum number is noted K, and can be defined beforehand to indicate how many iterations to perform. A specification of a maximum number of iteration is not required. It can also be decided, in other embodiment, that the estimation will be realized when a difference between $\hat{h}_{IC-MMSE}^{(i)}$ and $\hat{h}_{IC-MMSE}^{(i+1)}$ will be under a threshold t.

An analysis of the impact of the compensated part in the proposed algorithm is done in the description of a particular embodiment. The analysis shows that, at high signal-to-noise ration (SNR) and with sufficient iterations, the compensated part does not affect the accuracy of channel estimation. Below, we refer to LTE systems as an example. However, it is worth mentioning that the idea can be generalized to any OFDM(A)-based communication system.

The compensation process used during the MMSE algorithm gives the following advantages:

The proposed IC-MMSE algorithm always converges through iterations and has good performances in both SIMO and MIMO systems.

The proposed IC-MMSE algorithm has a much lower complexity than the traditional iterative MMSE algorithm.

With distributed resource allocation, do not need to re-calculate matrix inverse for each OFDM symbol.

The proposed IC-MMSE is independent to the resource allocation scheme.

2. Description of a Particular Embodiment 2.1 The Compensation Process

Figure 2:
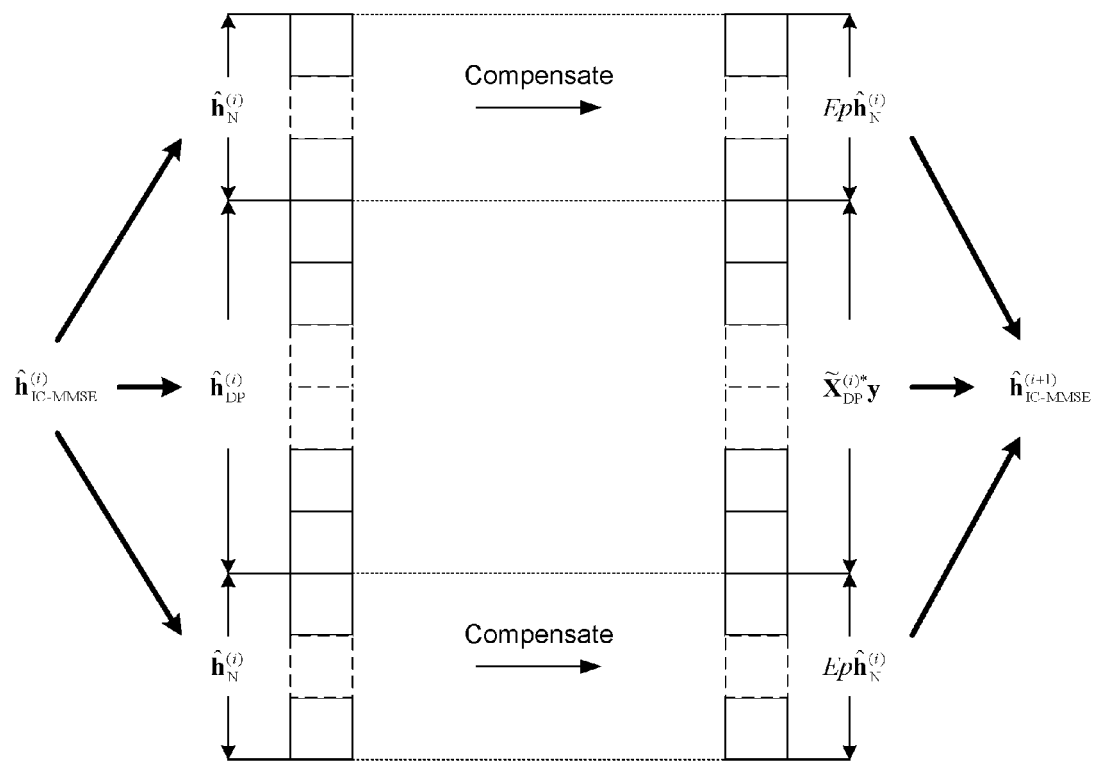
FIG. 2: illustrates a flow chart of the compensation on null subcarriers.

One key feature is the compensation process which is applied on the values of the estimates which correspond to the null subcarriers, as explained in relation with FIG. 2.

By using some kind of initial channel estimation algorithms, it is possible to obtain channel estimates over all sub-carriers based on pilot symbols. This initial channel estimate vector is noted $\hat{h}^{(0)}$. For example, the simple least square (LS) channel estimation can be a candidate (but it is not the only one).

The inventors have noticed that the initial channel estimate vector $\hat{h}^{(0)}$ can be separated into at least two parts (which gives at least two sub vectors):

$$\hat{h}^{(0)} = (\hat{h}_N^{(0)T}, \hat{h}_{DP}^{(0)T}, \quad (3)$$

where the vector $\hat{h}_{DP}^{(0)}$ represents the channel estimates on modulated part, including data and pilot symbols and vector $\hat{h}_N^{(0)}$ represents the channel estimates for the null part.

In the traditional MMSE channel estimation method, soft information are produced by the channel decoder during one iteration and used in the next iteration to build soft symbols $\tilde{x}_{DP}^{(0)}$. However, no soft information is available on the null part of the vector ($\hat{h}_N^{(0)}$), since no symbol is transmitted on these null sub-carriers.

The inventors have had the idea to assume the presence of symbols on these null subcarriers for simplifying the calculations to make during the iterations of the MMSE channel estimation method.

For realizing this, it is proposed, in this embodiment, to copy the channel estimates on the null part from the previous iteration $\hat{h}_N^{(i)}$ to the current iteration (for example the $i+1^{th}$) at the same position as in the initial channel estimation.

However, in order to implement iterative MMSE channel estimation, the power of transmitted symbol on each subcarrier is necessary. Thus, for the copied part, it is assumed that the channel estimates are obtained from pilot symbols and the transmitted power on this part is equal to the power of pilot symbols. This assumption does not affect the accuracy of channel estimates. With this assumption, it is like that some pilot symbols are transmitted on the null part where, actually, no symbol exists.

Thus, compared to the "actual" pilot symbols, some "virtual" pilot symbols are assumed to exist on the null part. Then, the copied channel estimates are considered together with the soft symbols to perform iterative MMSE channel estimation.

This copy process is called "compensation", as shown in FIG. 2.

With the channel estimates on the null part from the initial channel estimate, the compensation process can be described as:

1) In the initial channel estimation, use pilot symbols to obtain channel estimates over all sub-carriers in the vector $\hat{h}^{(0)}$;

2) Take the channel estimates over "null" part of the vector $\hat{h}^{(i)}$ (i=0, 1, 2, . . . , K−1) into next iteration and assume that some "virtual" pilot symbols exist on each "null" sub-carrier with the same power as the "actual" pilot symbols. This assumption is realized for at least one null subcarrier. In a specific embodiment, this assumption is realized for all null subcarrier;

3) Implement MMSE channel estimation by considering soft symbols, "actual" pilot symbols, and "virtual" pilot symbols over all sub-carriers to obtain $\hat{h}^{(i+1)}$;

4) Make i=i+1 and repeat step 2), 3) and 4) if the iteration number i is smaller than the maximum iteration number K, which is defined beforehand to indicate how many iterations to be performed.

The second step (2)), which is an important step, comprises, as described in FIG. 2:

splitting said current vector $\hat{h}^{(i)}$ in at least two distinct subvector ($\hat{h}_N^{(i)}, \hat{h}_{DP}^{(i)}$), at least one first subvector comprising channel estimates related to data symbols and/or pilots symbols ($\hat{h}_{DP}^{(i)}$) and at least one second subvector comprising channel estimates related to null symbols ($\hat{h}_N^{(i)}$);

decoding of said at least one first subvector ($\hat{h}_{DP}^{(i)}$), delivering at least one first treated subvector ($\hat{h}_{DP}^{(i)}*y$);

applying, to at least one element of said at least one second subvector $\hat{h}_N^{(i)}$, of said at least one reference power Ep, delivering at least one second treated subvector ($E_p \hat{h}_N^{(i)}$);

a new vector of channel estimates is then calculating, using said at least one first treated subvector ($\tilde{x}_{DP}^{(i)}*y$) and said at least one second treated subvector ($E_p \hat{h}_N^{(i)}$).

In this embodiment, the compensation process takes place during the channel estimation, in the successive iterations of the estimation method, as explained below.

5.2.1. Consequences of the Compensation Process in MMSE: IC-MMSE

With this compensation method described above, the IC-MMSE channel estimation at the $i+1^{th}$ iteration $\hat{h}_{IC-MMSE}^{(i+1)}$ can be written as:

$$\hat{h}_{IC-MMSE}^{(i+1)} = \Omega_L[\Omega_L^H(E_p,\tilde{R}_{N_{DP}\times N_{DP}}^{(i)})\Omega_L + \sigma^2 C_{gg}^{-1}]^{-1}\Omega_L^H(E_p\hat{h}_N^{(i)}, \tilde{X}_{DP}^{(i)*}y), \quad (4)$$

where $E_p$ stands for the power of pilot symbols, $E_p = E_p I_{N-N_{DP}}$ and $I_{N-N_{DP}}$ stands for an identity matrix of size $N-N_{DP}$, the matrix $(E_p, \tilde{R}_{N_{DP}\times N_{DP}}^{(i)})$ is a diagonal matrix defined as:

$$(E_P, \tilde{R}_{N_{DP}\times N_{DP}}^{(i)}) = \begin{pmatrix} E_P & 0 & 0 \\ 0 & \tilde{R}_{N_{DP}\times N_{DP}}^{(i)} & 0 \\ 0 & 0 & E_P \end{pmatrix}, \quad (5)$$

and $(E_p\hat{h}_N^{(i)}, \tilde{X}_{DP}^{(i)*}y)$ is a N×1 vector, where the diagonal matrix $\tilde{X}_{DP}^{(i)}$ includes all soft symbols and pilot symbols and the vector y represents the received signals.

In other words, comparing to the traditional MMSE, due to the compensation process of an embodiment of the invention, $\tilde{R}_{N\times N}^{(i)}$ is replaced by $(E_p, \tilde{R}_{N_{DP}\times N_{DP}}^{(i)})$. Also, $\tilde{x}^{(i)*}y$ is replaced by $(E_p\hat{h}_N^{(i)}, \tilde{X}_{DP}^{(i)*}y)$ in equation (1) for giving equation (4).

The diagonal entries of $(E_p, \tilde{R}_{N_{DP}\times N_{DP}}^{(i)})$ and the elements of $(E_p\hat{h}_N^{(i)}, \tilde{X}_{DP}^{(i)*}y)$ are arranged corresponding to the correct pattern of pilot and data arrangement (the arrangement which should be present in the signal). Since it is assumed that "virtual" pilot symbols are transmitted on the "null" part, together with the "actual" pilot symbols in the modulated part, the ratio of pilots to the whole bandwidth is high and consequently the power of all transmitted symbols is approximated to the power of pilot symbols.

Then, equation (4) can be approximated as:

$$\hat{h}_{IC-MMSE}^{(i+1)} = \underbrace{\Omega_L(\Omega_L^H\Omega_L + \sigma^2 C_{gg}^{-1})^{-1}\Omega_L^H}_{\text{constant}} \left(\hat{h}_N^{(i)}, \tilde{R}_{N_{DP}\times N_{DP}}^{(i)-1}\tilde{X}_{DP}^{(i)*}y\right) \quad (6)$$

$$= \Omega_L \hat{g}_{IC-MMSE}^{(i+1)}.$$

From equation (6), it can be seen that the first part, which includes a matrix inverse, is always constant and we do not need to perform matrix inverse at each iteration. This is the simplification which allows the reduction of the calculation complexity according to an embodiment of the invention.

Furthermore, with distributed resource allocation, since the positions of the allocated non-null parts are varying from one OFDM symbol to another one, the traditional iterative MMSE channel estimation in (1) has to choose different partial FFT matrices $\Omega_L$ for each OFDM symbol, resulting in more calculations. With the proposed IC-MMSE, thanks to the compensation process, it is not needed to choose the corresponding partial FFT matrices and to re-calculate the matrix inversions. Thus, the proposed compensated IC-MMSE has a much lower complexity than the traditional iterative MMSE channel estimator.

2.3 Theoretical Analysis

From theoretical analysis, the impulse response estimate from IC-MMSE $\hat{g}_{IC-MMSE}^{(i+t)}$ is approximately equal to the impulse response estimate based on only data and pilots $\hat{g}_{DP}$ with the assumption of high SNR and $t \to \infty$, where $\hat{g}_{DP}$ is defined as:

$$\Omega_L \hat{g}_{DP} = X_{DP}^{-1} y. \quad (7)$$

Therefore, the compensated method does not degrade the accuracy of channel estimates.

In order to assess the complexity of the IC-MMSE, the number of complex multiplications needed for the matrix inverse part in traditional iterative MMSE and the number of complex multiplications needed in IC-MMSE have been compared. In equation (1), for each iteration, the number of complex multiplications is $N_{DP}^2 L + N_{DP}L^2 + O(L^3)$.

In this embodiment, for IC-MMSE in equation (6) the constant part can be done offline and is kept the same value for all iterations and all OFDM symbols. Indeed, for one channel model, the values of the constant part are always constant. So, these constant parts can be set in hardware.

Therefore, at each iteration, the IC-MMSE only needs $N^2$ complex multiplications. Furthermore, if we consider i iterations, the difference between the traditional iterative MMSE and the IC-MMSE is $i\times(N_{DP}^2 L + N_{DP}L^2 + O(L^3) - N^2)$.

2.4 Other Embodiments

The IC-MMSE algorithm is proposed in single-input multi-output (SIMO) transmission, and it can also be used in multi-input multi-output (MIMO) transmission. With transmit diversity (taking two transmission antenna systems as an example), the received symbols on the $r^{th}$ receive antenna are:

$$y_r = \sum_{t=0}^{1} X_t h_{rt} \quad (0 \le r \le 1), \quad (8)$$

where $X_t$ stands for the transmitted symbols on the $t^{th}$ transmit antenna, and $h_{rt}$ represents the channels between the $t^{th}$ transmit antenna and the $r^{th}$ receive antenna. In the $i+1^{th}$ iteration, to estimate the channel vector $h_{rt}$, the received symbol vector $y_{rt}$ is approximated as:

$$y_{rt}^{(i+1)} = y_r - \hat{X}_{1-t}^{(i)} \hat{h}_{r(1-t)}^{(i)} \quad (0 \le r \le 1, 0 \le t \le 1), \quad (9)$$

where $\hat{X}_{1-t}^{(i)}$ and $\hat{h}_{r(1-t)}^{(i)}$ stand for the estimated transmitted symbols and channel estimates respectively which contain soft information from the $i^{th}$ iteration. Then, substituting equation (9) into equation (6), IC-MMSE channel estimates in transmit diversity transmission is obtained.

In LTE systems, rather than existing in every OFDM symbol, reference symbols are present only in certain OFDM symbols according to a special arrangement. In order to obtain all channel estimates with a low complexity in LTE, the IC-MMSE is only performed over the OFDM symbols where reference symbols exist. Then, based on the channel estimates from IC-MMSE, an interpolation in time domain is performed to obtain channel estimates over the other OFDM symbols where reference symbols do not exist. Some results have shown that, even with a simple time domain interpolation, we can have performances approaching those obtained with perfect channel state information (CSI).

In summary, an embodiment of the current invention presents an MMSE based channel estimation algorithm in LTE systems where some "null" subcarriers exist and special pilot arrangement is considered with limited number of pilot symbols. By introducing a compensation process, an iterative compensated MMSE (IC-MMSE) channel estimation algorithm is proposed. The proposed channel estimator has much lower complexity compared to traditional iterative MMSE channel estimator and shows good convergence behavior and excellent system performances.

In practice, the traditional MMSE algorithm is performed as filtering over a limited part of the FFT output in order to reduce the complexity further. Above proposed method can also be adapted to such cases where the described procedure is performed over a limited number of subcarriers. More specifically, the presented method focuses on the "null" part compensation and estimate the channel over all the useful bandwidth. This compensation process can be extended to "non-null" parts also. Indeed, for a certain user, the allocated resources and even pilots can be confined to only a part of the whole bandwidth, resulting in a "non-null" part where neither data nor pilots exist for that user. For this "non-null" part, channel estimates can also be compensated by the channel estimates in the previous iteration and the proposed IC-MMSE becomes applicable to such cases.

Figure 4:
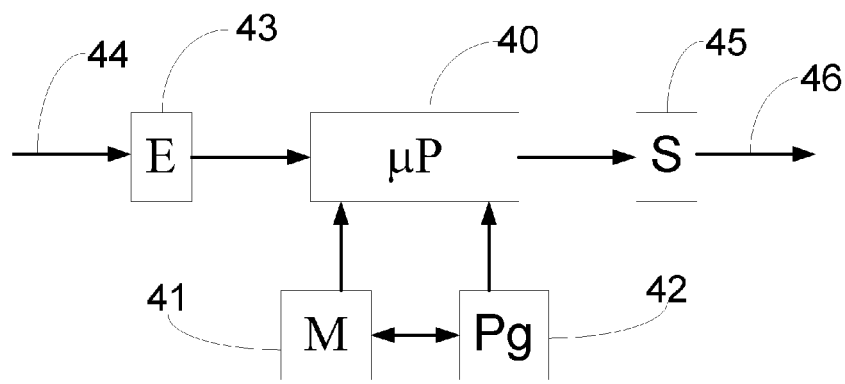
FIG. 4: illustrates an embodiment of a device for implementing the method of an embodiment of the invention.

The structure of an apparatus for the execution of the presented method is illustrated schematically in FIG. 4. It comprises a memory M 41, and a processing unit 40 equipped with a microprocessor μP, that is driven by a computer program (or application) Pg 42. At input, the processing unit 40 receives signal 44 through a network input interface module E 43. The microprocessor μP processes signal 44 according to the instructions of the program Pg 42, to estimate the channel 46 which will be transmitted through an interface module S 45.

3. Description of a Practical Example

Figure 3:
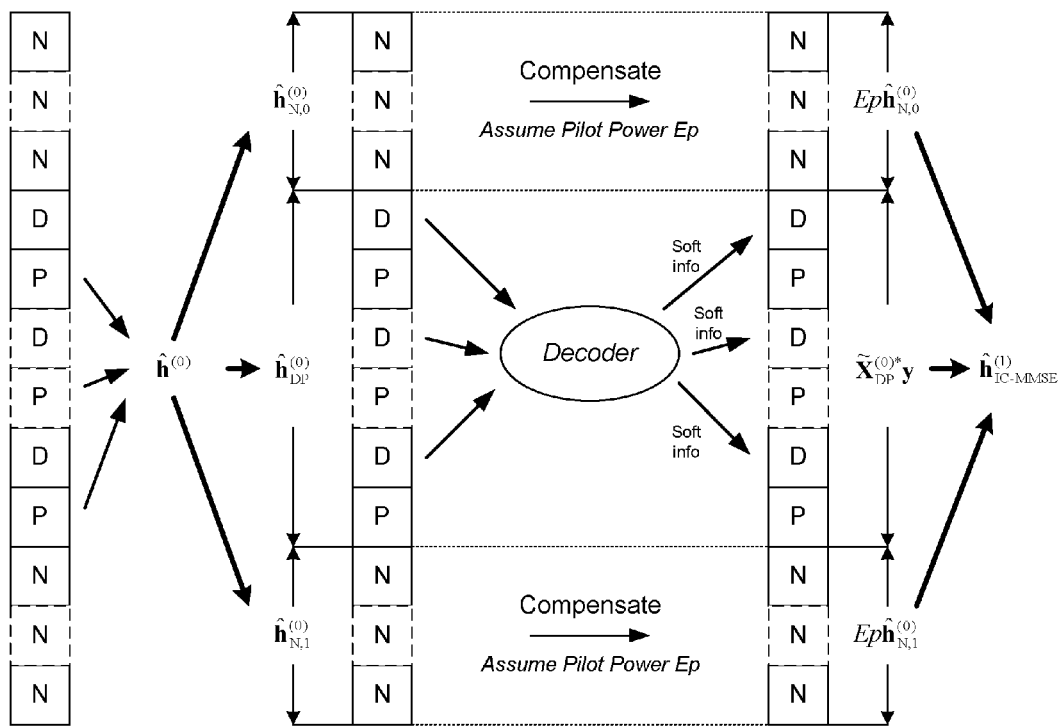
FIG. 3: illustrates a flow chart of an example of a compensation process.

In this section, a detailed example is shown in relation with FIG. 3, which represents IC-MMSE in the initial iteration and the first iteration.

In FIG. 3, N represents the null sub-carriers, where there is no data and no pilot symbols, P stands for the sub-carriers used for pilot symbols, and D is the sub-carriers used for data.
1. In the initial iteration, only pilot symbols are used to implement channel estimation. With the pilot symbols, the channel estimates $\hat{h}_{IC-MMSE}^{(0)}$ on all sub-carriers, including the N sub-carriers, are obtained. The channel estimates on the data and pilot symbol part is denoted as $\hat{h}_{DP}^{(0)}$ and the channel estimates on the null sub-carrier part is denoted as $\hat{h}_N^{(0)}$. Since the null sub-carriers normally exist at both sides of bandwidth, the channel estimates $\hat{h}_N^{(0)}$ can be expressed as $\hat{h}_N^{(0)} = (\hat{h}_{N,1}^{(0)}, \hat{h}_{N,2}^{(0)})$.
2. After detection and decoding, the soft information for all data symbols is obtained and the pilot symbols are kept the same as in the initial iteration. However, on the null sub-carrier part, neither data nor pilot symbols are available for channel estimation. Thus, the channel estimates in the initial iteration $\hat{h}_N^{(0)} = (\hat{h}_{N,1}^{(0)}, \hat{h}_{N,2}^{(0)})$ are copied to the same position in the current iteration. By assuming that these channel estimates are obtained from pilot symbols, it is assumed that the transmitted power on these null sub-carriers is equal to the power of pilot symbol $E_p$.
3. Using $E_p \hat{h}_N^{(0)}$, $\tilde{X}_{DP}^{(0)*} y$, and previously presented equation (6), new channel estimate $\hat{h}_{IC-MMSE}^{(1)}$ is obtained. In this step of this example, $E_p \hat{h}_N^{(i)}$ and $\tilde{X}_{DP}^{(i)*} y$ should be arranged as $(E_p \hat{h}_{N,1}^{(0)}, X_{DP}^{(0)*} y, E_p \hat{h}_{N,2}^{(0)})$, which is the "appropriate arrangement".

The invention claimed is:
1. A channel estimation treatment method, said channel estimation being used for obtaining binary data conveyed in a signal, said method comprising the following processing steps:
obtaining a vector of channel estimates, called a current vector, each element of the current vector corresponding to an estimate of a subchannel;
detecting, inside said current vector, at least one pilot symbol;
splitting said current vector in at least two distinct subvectors, at least one first subvector comprising channel estimates related to data symbols and/or pilots symbols and at least one second subvector comprising channel estimates related to null symbols;
decoding data which corresponds to the channel estimates in the first subvector, delivering at least one first treated subvector;
modifying, with a processing device, said at least one second subvector by assuming a presence of virtual pilot symbols in said at least one second subvector, delivering at least one second treated subvector, wherein said assuming is based on a hypothesis that a power (Ep) of virtual pilot symbols presented in said at least one second subvector is equal to a power of pilot symbols in said at least one first subvector; and
calculating, with the processing device, a new vector of channel estimates with said at least one first treated subvector and said at least one second treated subvector.

2. The channel estimation treatment method according to claim 1, wherein said processing steps are performed in an iterative process, so that said new vector of channel estimates of a current iteration is used as said current vector in a following iteration.

3. The channel estimation treatment method according to claim 2, wherein said iterative process is stopped after a predetermined maximum number of iterations K.

4. The channel estimation treatment method according to claim 2, wherein said iterative process is stopped when the difference between at least one element of said new vector of channel estimates and at least one corresponding element of said current vector of channel estimates is least than a predetermined threshold t.

5. The channel estimation treatment method according to claim 1, wherein said step of modifying said at least one second subvector comprises:
obtaining at least one reference power Ep of said at least one symbol pilot; and
applying, to at least one element of said at least one second subvector, of said at least one reference power Ep, delivering said at least one second treated subvector.

6. The channel estimation treatment method according to claim 1, wherein said step of calculating a new vector of channel estimates ($\hat{h}_{IC-MMSE}^{(i+1)}$) with said at least one first treated subvector ($\hat{h}_N^{(i)}$) and said at least one second treated subvector ($\hat{h}_{DP}^{(i)}$) implements the following function:

$$\hat{h}_{IC-MMSE}^{(i+1)} = \Omega_L (\Omega_L^H \Omega_L + \sigma^2 C_{gg}^{-1})^{-1} \Omega_L^H (\hat{h}_N^{(i)}, \tilde{R}_{N_{DP} \times N_{DP}}^{(i)-1} \tilde{X}_{DP}^{(i)*} y)$$

where:
$\Omega_L$ is a matrix comprising the first L columns of a predefined FFT matrix, said FFT matrix being a N×N constant matrix and only related to the number of sub-carriers;
L represents the delay spread of channel;
$\hat{h}_N^{(i)}$ denotes the first treated subvector;
$\tilde{R}_{N_{DP} \times N_{DP}}^{(i)-1}$ contains soft powers of transmitted symbols;
$\tilde{X}_{DP}^{(i)*}$ is a diagonal matrix comprising soft information;
y represents the received signals.

7. A channel estimation treatment device comprising:
a decoder;
a memory; and
a processor configured by instructions stored in the memory for executing steps comprising:
obtaining a vector of channel estimates, called a current vector, each element of the current vector corresponding to an estimate of a subchannel;

detecting, inside said current vector, at least one pilot symbol;

obtaining at least one reference power Ep of said at least one symbol pilot;

splitting said current vector in at least two distinct subvector, at least one first subvector comprising channel estimates related to data symbols and/or pilots symbols and at least one second subvector comprising channel estimates related to null symbols;

decoding data which corresponds to the channel estimates in said at least one first subvector by the decoder, delivering at least one first treated subvector;

applying, to at least one element of said at least one second subvector, of said at least one reference power Ep, delivering at least one second treated subvector; and calculating a new vector of channel estimates with said at least one first treated subvector and said at least one second treated subvector.

8. A non-transitory computer-readable medium comprising a computer program product stored thereon and comprising instructions of program code for implementing a method of channel estimation treatment when run on a computer, wherein the instructions comprise:

instructions configured to obtain a vector of channel estimates, called a current vector, each element of the current vector corresponding to an estimate of a subchannel;

instructions configured to detect, inside said current vector, at least one pilot symbol;

instructions configured to split said current vector in at least two distinct subvectors, at least one first subvector comprising channel estimates related to data symbols and/or pilots symbols and at least one second subvector comprising channel estimates related to null symbols;

instructions configured to decode, with a decoder, data which corresponds to the channel estimates in said at least one first subvector, delivering at least one first treated subvector;

instructions configured to modify, with a processing device, said at least one second subvector by assuming a presence of virtual pilot symbols in said at least one second subvector, delivering at least one second treated subvector, said assuming is based on a hypothesis that a power (Ep) of virtual pilot symbols presented in said at least one second subvector is equal to a power of pilot symbols in said at least one first subvector; and instructions configured to calculate, with the processing device, a new vector of channel estimates with said at least one first treated subvector and said at least one second treated subvector.

\* \* \* \* \*